US012422136B2

(12) United States Patent
Sung et al.

(10) Patent No.: US 12,422,136 B2
(45) Date of Patent: Sep. 23, 2025

(54) COOLING SYSTEM AND CONTROL METHOD OF COOLING SYSTEM

(71) Applicant: CARUX TECHNOLOGY PTE. LTD., Singapore (SG)

(72) Inventors: Li-Wei Sung, Tainan (TW); Chih-Ming Chang, Tainan (TW); Ke-Chin Chang, Tainan (TW); You-Ren Liou, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 112 days.

(21) Appl. No.: 18/460,615

(22) Filed: Sep. 4, 2023

(65) Prior Publication Data

US 2024/0200766 A1  Jun. 20, 2024

Related U.S. Application Data

(60) Provisional application No. 63/433,760, filed on Dec. 20, 2022.

(51) Int. Cl.
*F21V 29/61* (2015.01)
*B60H 1/00* (2006.01)
*B60K 35/00* (2006.01)
*F21V 29/67* (2015.01)
*B60K 35/22* (2024.01)

(52) U.S. Cl.
CPC ......... *F21V 29/61* (2015.01); *B60H 1/00271* (2013.01); *B60K 35/00* (2013.01); *F21V 29/677* (2015.01); *B60H 2001/003* (2013.01); *B60K 35/22* (2024.01); *B60K 2360/34* (2024.01)

(58) Field of Classification Search
CPC ... F21V 29/677; F21V 29/61; B60H 1/00271; B60K 35/00; B60K 35/22; B60K 2360/34; B60K 2001/003
See application file for complete search history.

(56) References Cited

U.S. PATENT DOCUMENTS

2022/0205626 A1* 6/2022 Hisatsugu ............. F21V 29/677
2022/0342261 A1* 10/2022 Nishizaka ......... G02F 1/133612

* cited by examiner

*Primary Examiner* — Anne M Hines
(74) *Attorney, Agent, or Firm* — JCIPRNET

(57) ABSTRACT

A cooling system and a control method of the cooling system are provided. The cooling system includes a display device, a temperature sensor, a cooling fan and a temperature controller. The display device includes a backlight module. The temperature sensor is configured in the backlight module. The temperature sensor senses a first temperature of the backlight module and a second temperature of the backlight module. The first temperature is higher than the second temperature. The cooling fan is configured in the backlight module. The cooling fan provides a cooling path. The temperature controller receives the first temperature and the second temperature from the temperature sensor, and controls the cooling fan to enable or disable.

17 Claims, 17 Drawing Sheets

COOLING SYSTEM AND CONTROL METHOD OF COOLING SYSTEM

CROSS-REFERENCE TO RELATED APPLICATION

This application claims the priority benefit of U.S. Provisional application Ser. No. 63/433,760, filed on Dec. 20, 2022. The entirety of the above-mentioned patent application is hereby incorporated by reference herein and made a part of this specification.

BACKGROUND

Technical Field

The disclosure generally relates to a cooling system and a control method of the cooling system, and more particularly to a cooling system of a vehicle and a control method of the cooling system.

Description of Related Art

Generally, vehicles are used extensively as means of movement. In order to improve a riding comfort of the user, an air conditioning system may be provided within the vehicles. However, recent vehicles include electronic devices (for example, a display and/or an electronic dashboard). How to take into account the ride comfort in the vehicles and a cooling mechanism of the electronic devices are one of the research and development focuses of those skilled in the art.

SUMMARY

The disclosure is related to a cooling system and a control method of the cooling system.

The disclosure provides a cooling system. The cooling system includes a display device, a temperature sensor, a cooling fan and a temperature controller. The display device displays an image. The display device includes a backlight module. The temperature sensor is configured in the backlight module. The temperature sensor senses a first temperature of the backlight module and a second temperature of the backlight module. The first temperature is higher than the second temperature. The cooling fan is configured in the backlight module. The cooling fan provides a cooling path. The temperature controller receives the first temperature and the second temperature from the temperature sensor, and controls the cooling fan to enable or disable.

The disclosure provides a control method of a cooling system. The cooling system includes a display device, a temperature sensor and a cooling fan. The control method includes: detecting a status of a backlight module of the display device; controlling the temperature sensor to sense a temperature of the backlight module after the backlight module is started up; enabling the cooling fan when the temperature of the backlight module sensed by the temperature sensor is higher than a first temperature; and disabling the cooling fan when the temperature is lower than a second temperature. The wherein the first temperature is higher than the second temperature.

The disclosure provides another cooling system. The cooling system includes a driving power, a temperature sensor, a cooling fan and a temperature controller. The temperature sensor is configured in a cockpit. The temperature sensor senses a first temperature of the cockpit and a second temperature of the cockpit. The first temperature is higher than the second temperature. The cooling fan is configured in the cockpit. The cooling fan provides a cooling path. The temperature controller receives the first temperature and the second temperature from the temperature sensor, and controls the cooling fan to enable or disable.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
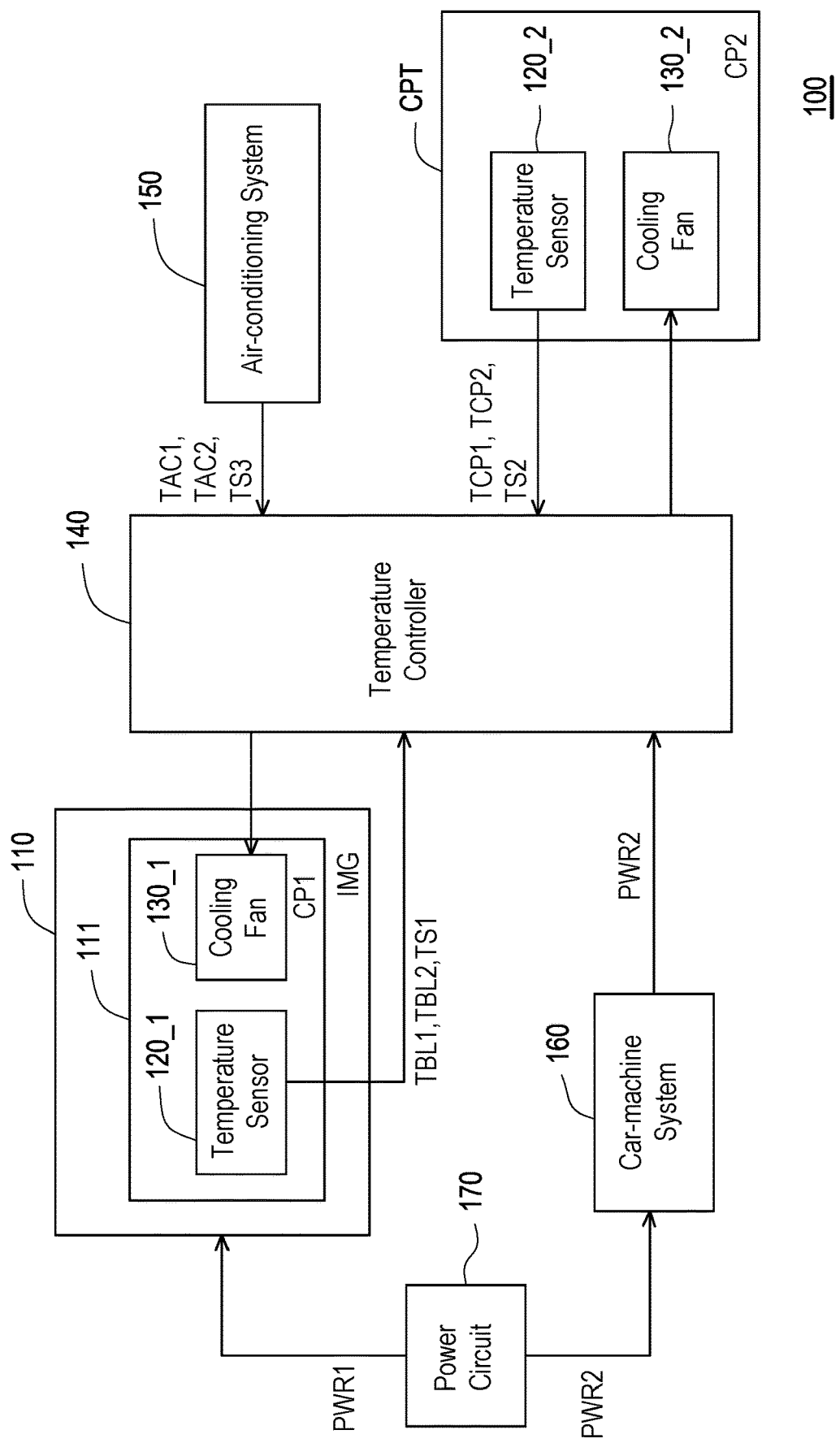
FIG. 1 illustrates a schematic diagram of a cooling system according to an embodiment of the disclosure.

A disclosure may be understood by reference to the following detailed description, taken in conjunction with the drawings as described below. It is noted that, for purposes of illustrative clarity and being easily understood by the readers, various drawings of this disclosure show a portion of an electronic device, and certain elements in various drawings may not be drawn to scale. In addition, the number and dimension of each device shown in drawings are only illustrative and are not intended to limit the scope of a disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". Thus, when the terms "include", "comprise" and/or "have" are used in the description of a disclosure, the corresponding features, areas, steps, operations and/or components would be pointed to existence, but not limited to the existence of one or a plurality of the corresponding features, areas, steps, operations and/or components.

It will be understood that when an element is referred to as being "coupled to", "connected to", or "conducted to" another element, it may be directly connected to the other element and established directly electrical connection, or intervening elements may be presented therebetween for relaying electrical connection (indirectly electrical connection). In contrast, when an element is referred to as being "directly coupled to", "directly conducted to", or "directly connected to" another element, there are no intervening elements presented.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

In a disclosure, the embodiments use "pixel" or "pixel unit" as a unit for describing a specific region including at least one functional circuit for at least one specific function. Describing "pixel with circuit" as "circuit" is available for a disclosure. For example, a "pixel with current source" may be described as a "current source", or a "pixel with current sink" may be described as a "current sink". The region of a "pixel" is depended on a unit for providing a specific function, adjacent pixels may share the same parts or wires, but may also include its own specific parts therein. For example, adjacent pixels may share a same scan line or a same data line, but the pixels may also have their own transistors or capacitance.

In a disclosure, a current source circuit is a circuit unit for outputting current, and a current sink is a circuit unit for draining current. The adjacent circuit units may share the same parts or wires and may also include its specific parts therein.

It should be noted that the technical features in different embodiments described in the following can be replaced, recombined, or mixed with one another to constitute another embodiment without departing from the spirit of a disclosure.

FIG. 1 illustrates a schematic diagram of a cooling system according to an embodiment of the disclosure. Referring to FIG. 1, in the embodiment, a cooling system 100 is used for a vehicle. The cooling system 100 includes a display device 110, temperature sensors 120_1, 120_2, a cooling fans 130_1, 130_2, a temperature controller 140, an air-conditioning system 150, a car-machine system 160 and a power circuit 170. The display device 110 displays an image IMG.

The display device 110 includes a backlight module 111. For example, the display device 110 may be an electronic dashboard, a navigation display device, an alarm display device and/or a status display device of the vehicle, but not be limited thereto.

In the embodiment, the temperature sensor 120_1 is configured in the backlight module 111. The temperature sensor 120_1 senses a first temperature TBL1 of the backlight module 111 and a second temperature TBL2 of the backlight module 111. The first temperature TBL1 is higher than the second temperature TBL2. Both the first temperature TBL1 and the second temperature TBL2 are default temperatures for the backlight module 111.

The cooling fan 130_1 is configured in the backlight module 111. The cooling fan 130_1 provides a cooling path CP1 in the backlight module 111. The temperature controller 140 is electrically connected to the display device 110, the temperature sensor 120_1, the cooling fans 130_1 and the air-conditioning system 150. In the embodiment, the temperature controller 140 receives the first temperature TBL1 and the second temperature TBL2 from the temperature sensor 120_1, and controls the cooling fan 130_1 to enable or disable.

In the embodiment, the temperature sensor 120_2 is configured in a cockpit CPT of the vehicle. The temperature sensor 120_2 senses a first temperature TCP1 of the cockpit CPT and a second temperature TCP2 of the cockpit CPT. The first temperature TCP1 is higher than the second temperature TCP2. Both the first temperature TCP1 and the second temperature TCP2 are default temperatures for the cockpit CPT. For example, the temperature sensor 120_2 may be configured on a vehicle seat in the cockpit CPT or configured near the vehicle seat in the cockpit CPT, but not be limited thereto.

The cooling fan 130_2 is configured in the cockpit CPT. The cooling fan 130_2 provides a cooling path CP2. The temperature controller 140 is further electrically connected to the temperature sensor 120_2, the cooling fans 130_2. The temperature controller 140 receives the first temperature TCP1 and the second temperature TCP2 from the temperature sensor 120_2, and controls the cooling fan 130_2 to enable or disable.

In the embodiment, the air-conditioning system 150 is electrically connected to the temperature controller. The air-conditioning system 150 is used to control the temperature inside the vehicle. In the embodiment, the car-machine system 160 is electrically connected to the temperature controller 140. The car-machine system 160 is used to integrate and process an information of the vehicle, such as audio-visual entertainment, communication related to Internet of Vehicles technology and/or navigation, but not limited thereto. In some embodiments, the car-machine system 160 is electrically connected to the display device 110.

In the embodiment, the power circuit 170 provides driving powers PWR1, PWR2. The power circuit 170 provides the driving power PWR1 to drive the display device 110. The power circuit 170 provides the driving power PWR2 to drive the car-machine system 160. In an embodiment, the driving power PWR1 may be equal to the driving power PWR2. In another embodiment, the driving power PWR1 may be different from the driving power PWR2.

In the embodiment, a driving power of the cooling system 100 is provided by the car-machine system 160. In the embodiment, at least the temperature controller 140 is driven by a driving power PWR2 provided by the car-machine system 160.

Figure 2:
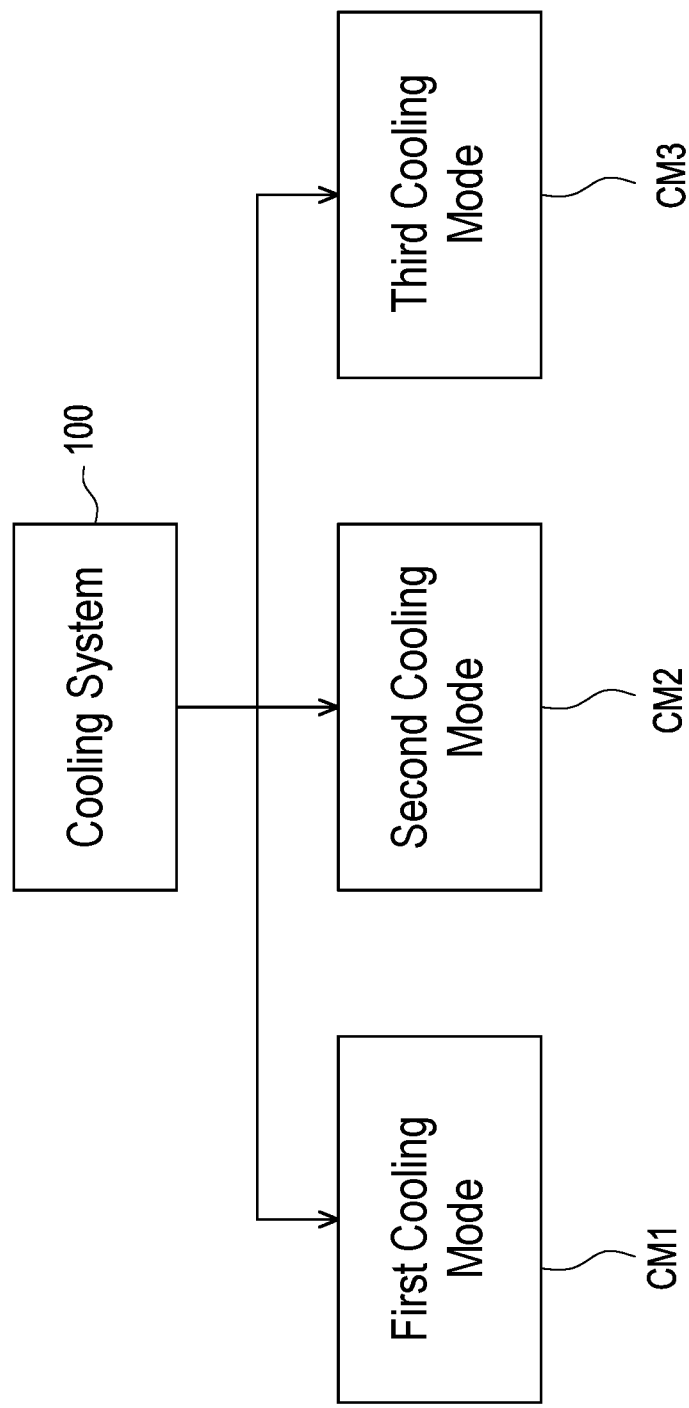
FIG. 2 illustrates cooling modes of a cooling system according to an embodiment of the disclosure.

FIG. 2 illustrates cooling modes of a cooling system according to an embodiment of the disclosure. Referring to FIG. 1 and FIG. 2, in the embodiment, the cooling system 100 can operate in at least one of a first cooling mode CM1, a second cooling mode CM2 and a third cooling mode CM3.

In the first cooling mode CM1, the temperature controller 140 controls the cooling fan 130_2 according to a temperature TS2 in the cockpit CPT. In the second cooling mode CM2, the temperature controller 140 controls the air-conditioning system 150 according to a temperature TS3 in the vehicle. In the third cooling mode CM3, the temperature controller 140 controls the cooling fan 130_1 according to a temperature TS1 in the backlight module 111.

Figure 3A:
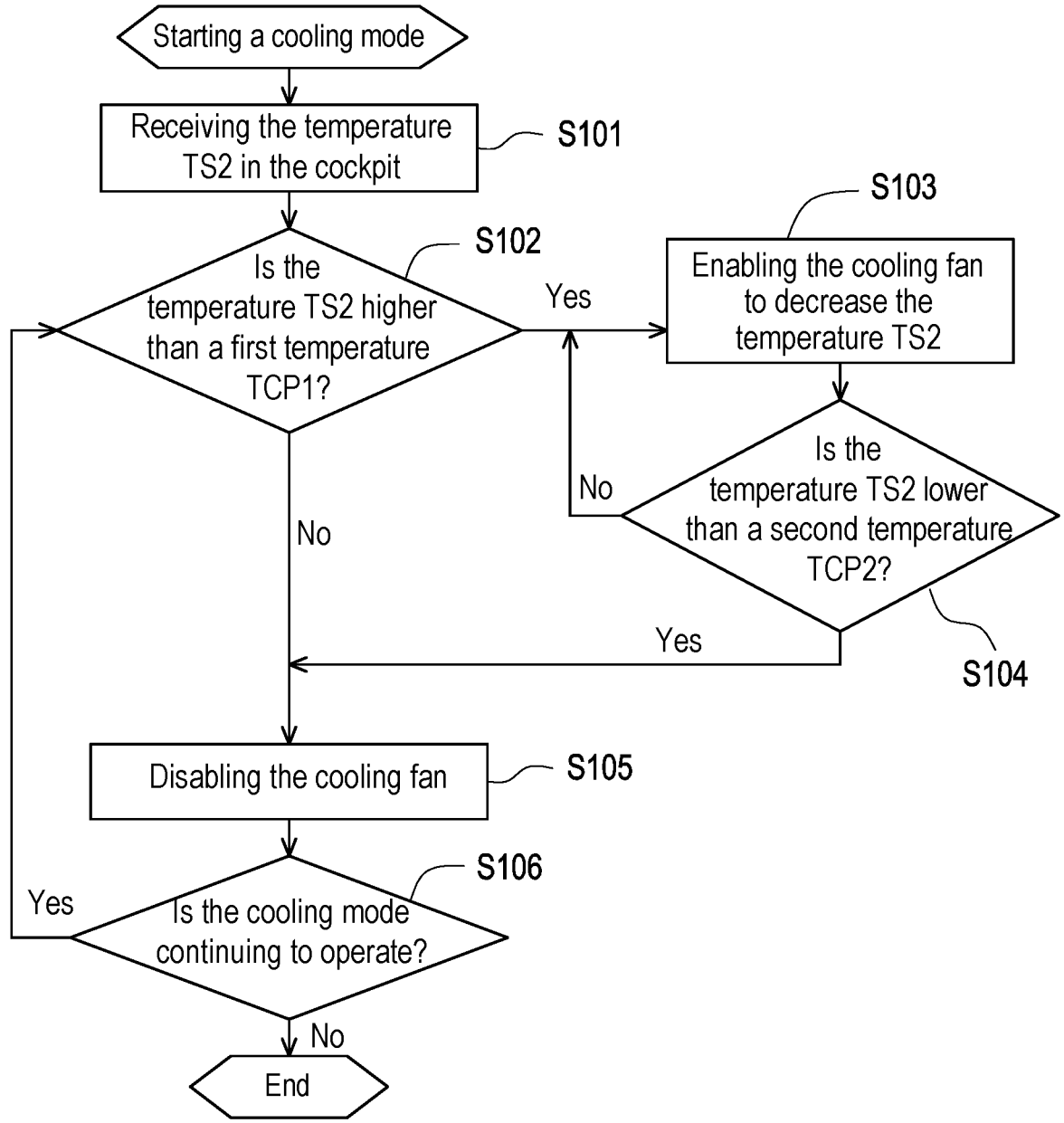
FIG. 3A illustrates a flow chart of a control method according to an embodiment of the disclosure.

FIG. 3A illustrates a flow chart of a control method according to an embodiment of the disclosure Referring to FIG. 1 and FIG. 3A, in the embodiment, a control method S100 is used for the cooling system 100. The control method S100 includes steps S101 to S106. After the car-machine system 160 is driven by the power circuit 170, a cooling mode is started up. The temperature controller 140 is started up when the car-machine system 160 is started up. The temperature controller 140 receives the temperature TS2 in the cockpit CPT from the temperature sensor 120_2 in the step S101. The temperature controller 140 determines the temperature TS2 in the step S102. When the temperature TS2 is higher than the first temperature TCP1 (for example, 28±3° C., but not be limited thereto), the temperature controller 140 judges that the temperature TS2 exceeds a sensitive temperature range of a user in the cockpit CPT. Therefore, the temperature controller 140 enables the cooling fan 130_2 in the step S103. In the step S103, the cooling fan 130_2 operates to decrease the temperature TS2 in the cockpit CPT. In the step S104, the temperature controller 140 determines the temperature TS2. When the temperature TS2 is higher than or equal to the second temperature TCP2 (for example, 22±3° C., but not be limited thereto), the temperature controller 140 operates in the step S103. On the other hand, when the temperature TS2 is lower than the second temperature TCP2, the temperature controller 140 judges that the temperature TS2 is in the sensitive temperature range of the user in the cockpit CPT. Therefore, the temperature controller 140 disables the cooling fan 130_2 in the step S105.

In the step S102, when the temperature TS2 is lower than or equal to the first temperature TCP1, the temperature controller 140 disables the cooling fan 130_2 in the step S105.

In the step S106, the temperature controller 140 determines whether to continue the cooling mode. When the cooling mode continues to operate, the temperature controller 140 operates in the step S102. When the cooling mode is finished, the cooling system 100 finishes the control method S100.

The cooling mode of the control method S100 is the first cooling mode CM1 as shown in the FIG. 2. In some embodiment, based on the cooling mode of the control method S100, the cooling system 100 may be simplified. For example, the temperature sensor 120_1 and the cooling fan 130_1 can be omitted.

Figure 3B:
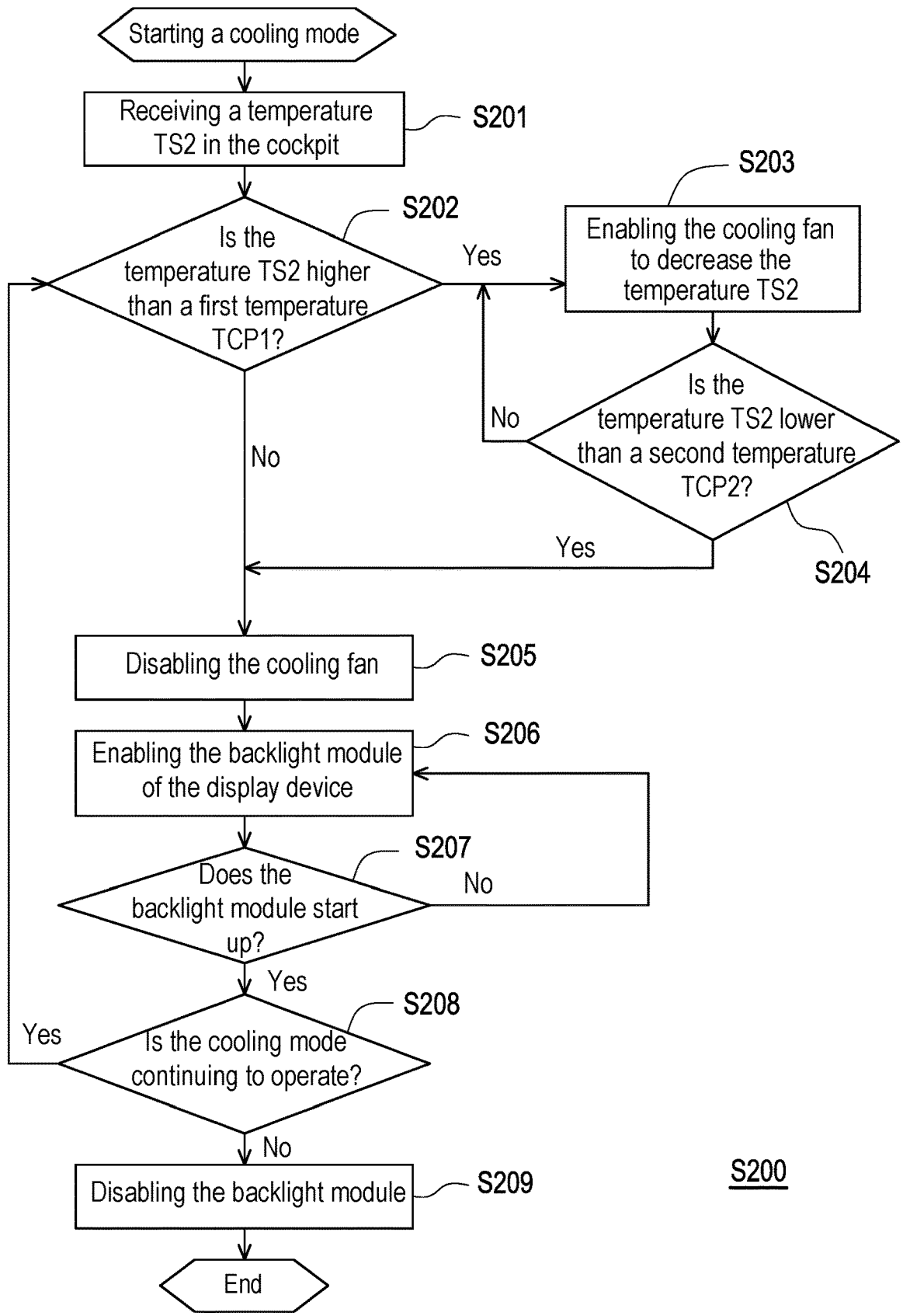
FIG. 3B illustrates a flow chart of a control method according to an embodiment of the disclosure.

FIG. 3B illustrates a flow chart of a control method according to an embodiment of the disclosure. Referring to FIG. 1 and FIG. 3B, in the embodiment, a control method S200 is used for the cooling system 100. The control method S200 includes steps S201 to S209. After the car-machine system 160 is driven by the power circuit 170, a cooling mode is started up. The temperature controller 140 receives the temperature TS2 in the cockpit CPT from the temperature sensor 120_2 in the step S201. The temperature controller 140 determines the temperature TS2 in the step S202. When the temperature TS2 is higher than the first temperature TCP1, the temperature controller 140 enables the cooling fan 130_2 in the step S203. In the step S204, the temperature controller 140 determines the temperature TS2. When the temperature TS2 is higher than or equal to the second temperature TCP2, the temperature controller 140 operates in the step S203. On the other hand, when the temperature TS2 is lower than the second temperature TCP2, the temperature controller 140 disables the cooling fan 130_2 in the step S205.

After the cockpit CPT is cooled down in the step S205, the backlight module 111 is enabled in the step S206. In the embodiment, the display device 110 enables the backlight module 111 in the step S206 and monitors a status of the backlight module 111 in the step S207. When the backlight module 111 does not start up, the display device 110 enables the backlight module 111 again in the step S206. When the backlight module 111 starts up, the temperature controller 140 determines whether to continue the cooling mode in the step S208. When the cooling mode continues to operate, the temperature controller 140 operates in the step S202. When the cooling mode is finished, the display device 110 disables the backlight module 111 in the step S209. After the step S209, the cooling system 100 finishes the control method S200.

The cooling mode of the control method S200 is the first cooling mode CM1 as shown in the FIG. 2. In some embodiment, based on the cooling mode of the control method S200, the cooling system 100 may be simplified. For example, the temperature sensor 120_1 and the cooling fan 130_1 can be omitted.

Figure 3C:
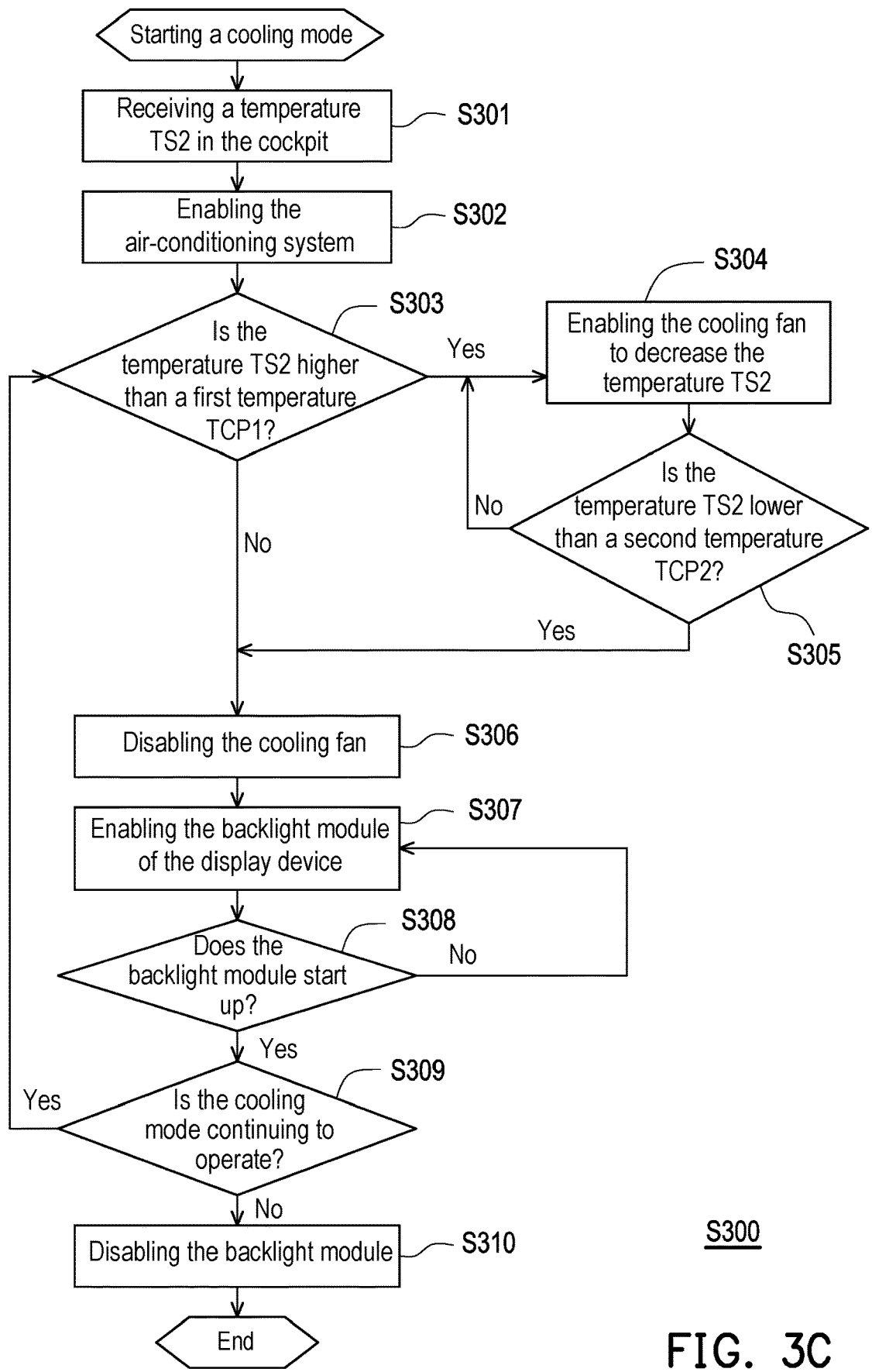
FIG. 3C illustrates a flow chart of a control method according to an embodiment of the disclosure.

FIG. 3C illustrates a flow chart of a control method according to an embodiment of the disclosure. Referring to FIG. 1 and FIG. 3C, in the embodiment, a control method S300 is used for the cooling system 100. The control method S300 includes steps S301 to S310. After the car-machine system 160 is driven by the power circuit 170, a cooling mode is started up. The temperature controller 140 receives the temperature TS2 in the cockpit CPT from the temperature sensor 120_2 in the step S301. The cooling system 100 enables the air-conditioning system 150 in the step S302. For example, the air-conditioning system 150 may be enabled by the temperature controller 140 or the car-machine system 160. The steps S303 to S310 is performed after the step S302. The steps S303 to S310 are similar to the steps S202 to S209, so it will not be repeated here. In other words, the backlight module 111 is enabled after the air-conditioning system 150 is enabled.

Besides, in some embodiments, the air-conditioning system 150 may enable the cooling fan 130_2 according to the first temperature TCP1. In the step S303, when the temperature TS2 is higher than a first temperature TCP1, the air-conditioning system 150 enables the cooling fan 130_2 according to the first temperature TCP1 in the step S304.

Figure 4A:
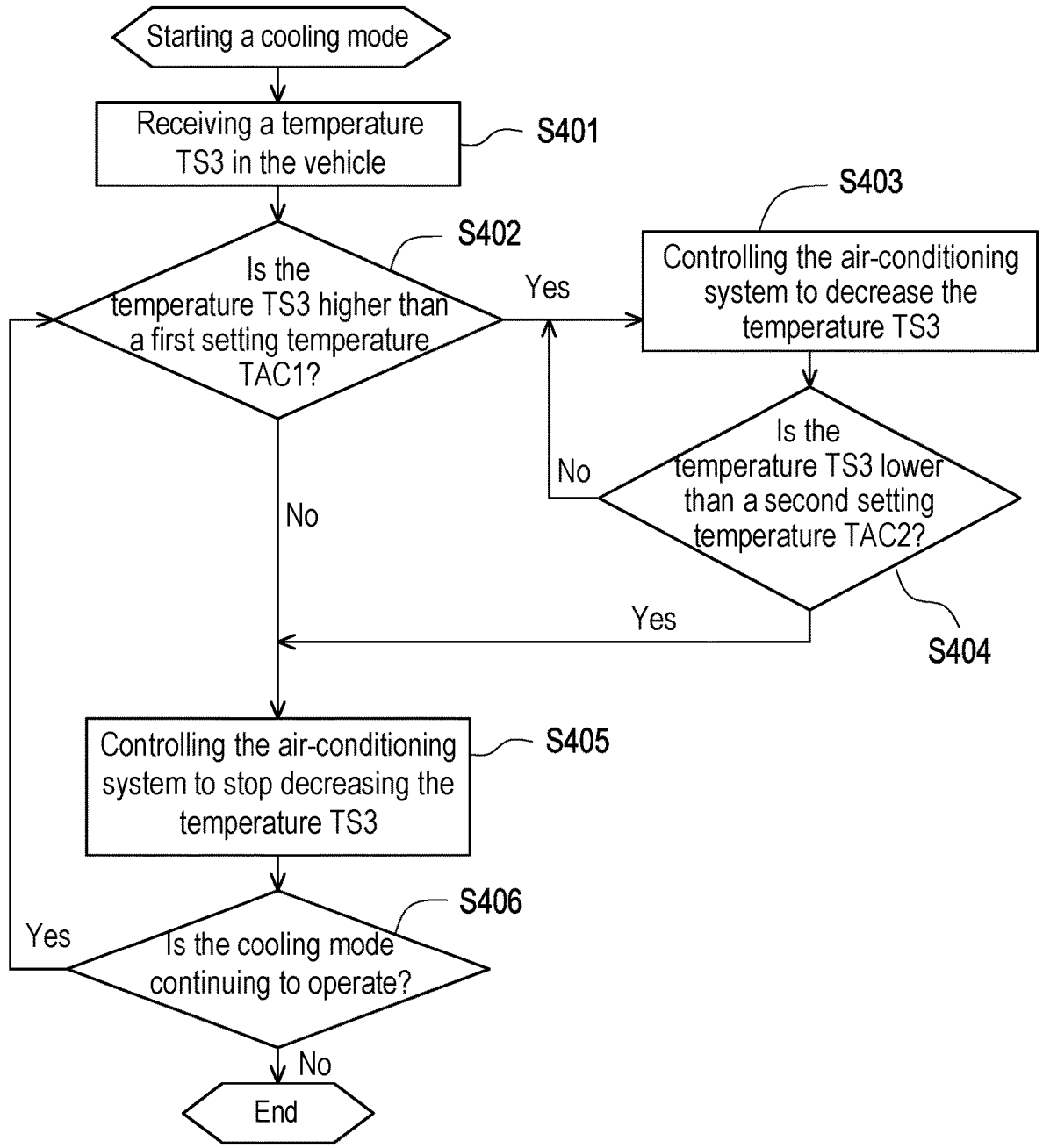
FIG. 4A illustrates a flow chart of a control method according to an embodiment of the disclosure.

FIG. 4A illustrates a flow chart of a control method according to an embodiment of the disclosure. Referring to FIG. 1 and FIG. 4A, in the embodiment, a control method S400 is used for the cooling system 100. The control method S400 includes steps S401 to S406. After the air-conditioning system 150 and the car-machine system 160 is driven by the power circuit 170, a cooling mode is started up. The temperature controller 140 receives the temperature TS3 in the vehicle in the step S401. The temperature controller 140 determines the temperature TS3 in the step S402. When the temperature TS3 is higher than a first setting temperature TAC1 (for example, 35±3° C., but not be limited thereto), the temperature controller 140 controls the air-conditioning system to decrease the temperature TS3 in the step S403. In the step S403, the air-conditioning system 150 operates to decrease the temperature TS3 in the vehicle. In the step S404, the temperature controller 140 determines the temperature TS3. When the temperature TS3 is higher than or equal to a second setting temperature TAC2 (for example, 25±3° C., but not be limited thereto), the temperature controller 140 operates in the step S403. On the other hand, when the temperature TS3 is lower than the second setting temperature TAC2, the temperature controller 140 controls the air-conditioning system 150 to stop decreasing the temperature TS3 in the step S405.

In the step S402, when the temperature TS3 is lower than or equal to the first setting temperature TAC1, the temperature controller 140 controls the air-conditioning system 150 to stop decreasing the temperature TS3 in the step S405.

In the step S406, the temperature controller 140 determines whether to continue the cooling mode. When the cooling mode continues to operate, the temperature controller 140 operates in the step S402. When the cooling mode is finished, the cooling system 100 finishes the control method S400.

The cooling mode of the control method S400 is the second cooling mode CM2 as shown in the FIG. 2. In some embodiment, based on the cooling mode of the control method S400, the cooling system 100 may be simplified. For example, the temperature sensors 120_1, 120_2 and the cooling fan 130_1, 130_3 can be omitted.

Figure 4B:
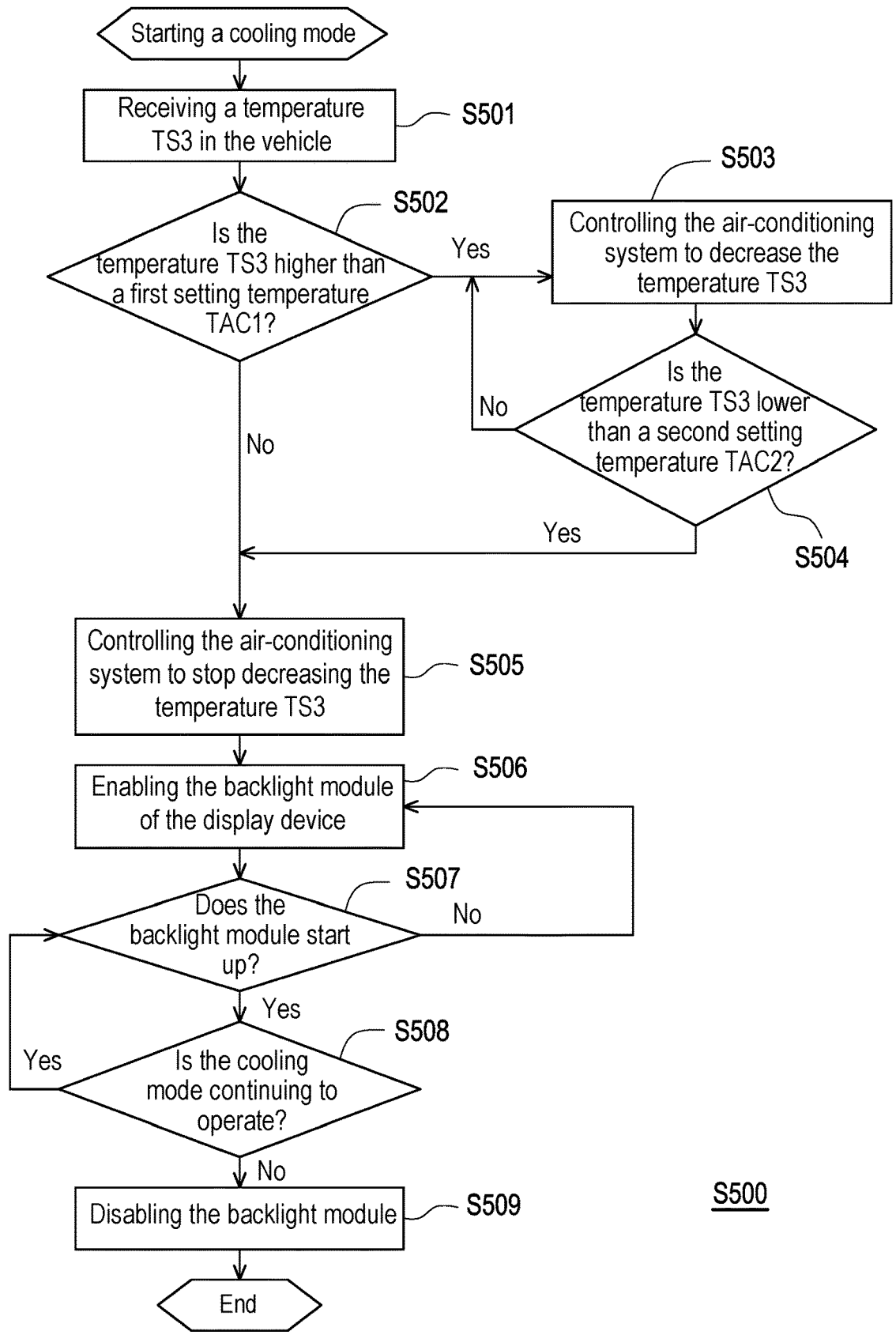
FIG. 4B illustrates a flow chart of a control method according to an embodiment of the disclosure.

FIG. 4B illustrates a flow chart of a control method according to an embodiment of the disclosure Referring to FIG. 1 and FIG. 4B, in the embodiment, a control method S500 is used for the cooling system 100. The control method S500 includes steps S501 to S509. After the air-conditioning system 150 and the car-machine system 160 is driven by the power circuit 170, a cooling mode is started up. The temperature controller 140 receives the temperature TS3 in the vehicle in the step S501. The temperature controller 140 determines the temperature TS3 in the step S502. When the temperature TS3 is higher than a first setting temperature TAC1, the temperature controller 140 controls the air-conditioning system 150 to decrease the temperature TS3 in the step S503. In the step S504, the temperature controller 140 determines the temperature TS3. When the temperature TS3 is higher than or equal to a second setting temperature TAC2, the temperature controller 140 operates in the step S503. On the other hand, when the temperature TS3 is lower than the second setting temperature TAC2, the temperature controller 140 controls the air-conditioning system 150 to stop decreasing the temperature TS3 in the step S505.

In the step S502, when the temperature TS3 is lower than or equal to the first setting temperature TAC1, the temperature controller 140 controls the air-conditioning system 150 to stop decreasing the temperature TS3 in the step S505.

After a compartment in the vehicle is cooled down in the step S505, the backlight module 111 is enabled in the step S506. The display device 110 enables the backlight module 111 in the step S506 and monitors a status of the backlight module 111 in the step S507. When the backlight module 111 does not start up, the display device 110 enables the backlight module 111 again in the step S506. When the backlight module 111 starts up, the temperature controller 140 determines whether to continue the cooling mode in the step S508. When the cooling mode continues to operate, the temperature controller 140 operates in the step S507. When the cooling mode is finished, the display device 110 disables the backlight module 111 in the step S509. After the step S509, the cooling system 100 finishes the control method S500.

In some embodiment, when the cooling mode continues to operate, the temperature controller 140 operates in the step S502.

Figure 5A:
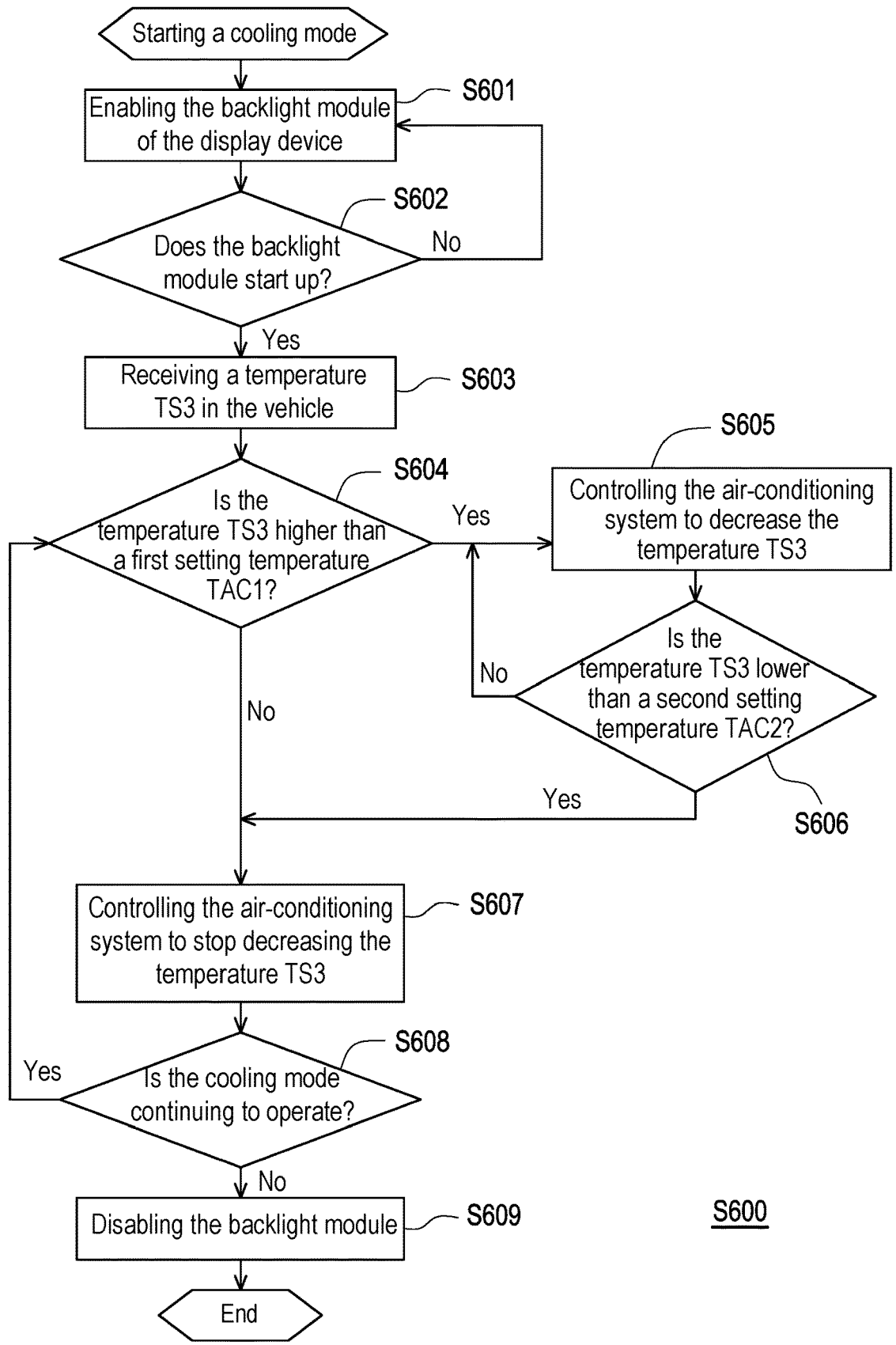
FIG. 5A illustrates a flow chart of a control method according to an embodiment of the disclosure.

FIG. 5A illustrates a flow chart of a control method according to an embodiment of the disclosure. Referring to FIG. 1 and FIG. 5A, in the embodiment, a control method S600 is used for the cooling system 100. The control method S600 includes steps S601 to S609. After the air-conditioning system 150 and the car-machine system 160 is driven by the power circuit 170, a cooling mode is started up. The backlight module 111 is enabled in the step S601. The display device 110 enables the backlight module 111 in the step S601 and monitors a status of the backlight module 111 in the step S602. When the backlight module 111 does not start up, the display device 110 enables the backlight module 111 again in the step S601.

When the backlight module 111 starts up, the temperature controller 140 starts receiving the temperature TS3 in the vehicle in the step S603 and determines the temperature TS3 in the step S604. When the temperature TS3 is higher than a first setting temperature TAC1, the temperature controller 140 controls the air-conditioning system to decrease the temperature TS3 in the step S605. In the step S606, the temperature controller 140 determines the temperature TS3. When the temperature TS3 is higher than or equal to a second setting temperature TAC2, the temperature controller 140 operates in the step S605. On the other hand, when the temperature TS3 is lower than the second setting temperature TAC2, the temperature controller 140 controls the air-conditioning system 150 to stop decreasing the temperature TS3 in the step S607.

In the step S604, when the temperature TS3 is lower than or equal to the first setting temperature TAC1, the temperature controller 140 controls the air-conditioning system 150 to stop decreasing the temperature TS3 in the step S607.

In the step S608, the temperature controller 140 determines whether to continue the cooling mode. When the cooling mode continues to operate, the temperature controller 140 operates in the step S604. When the cooling mode is finished, the display device 110 disables the backlight module 111 in the step S609 and finishes the control method S600.

The cooling mode of the control method S600 is the second cooling mode CM2 as shown in the FIG. 2. In some embodiment, based on the cooling mode of the control method S600, the cooling system 100 may be simplified. For example, the temperature sensors 120_1, 120_2 and the cooling fan 130_1, 130_3 can be omitted.

Figure 5B:
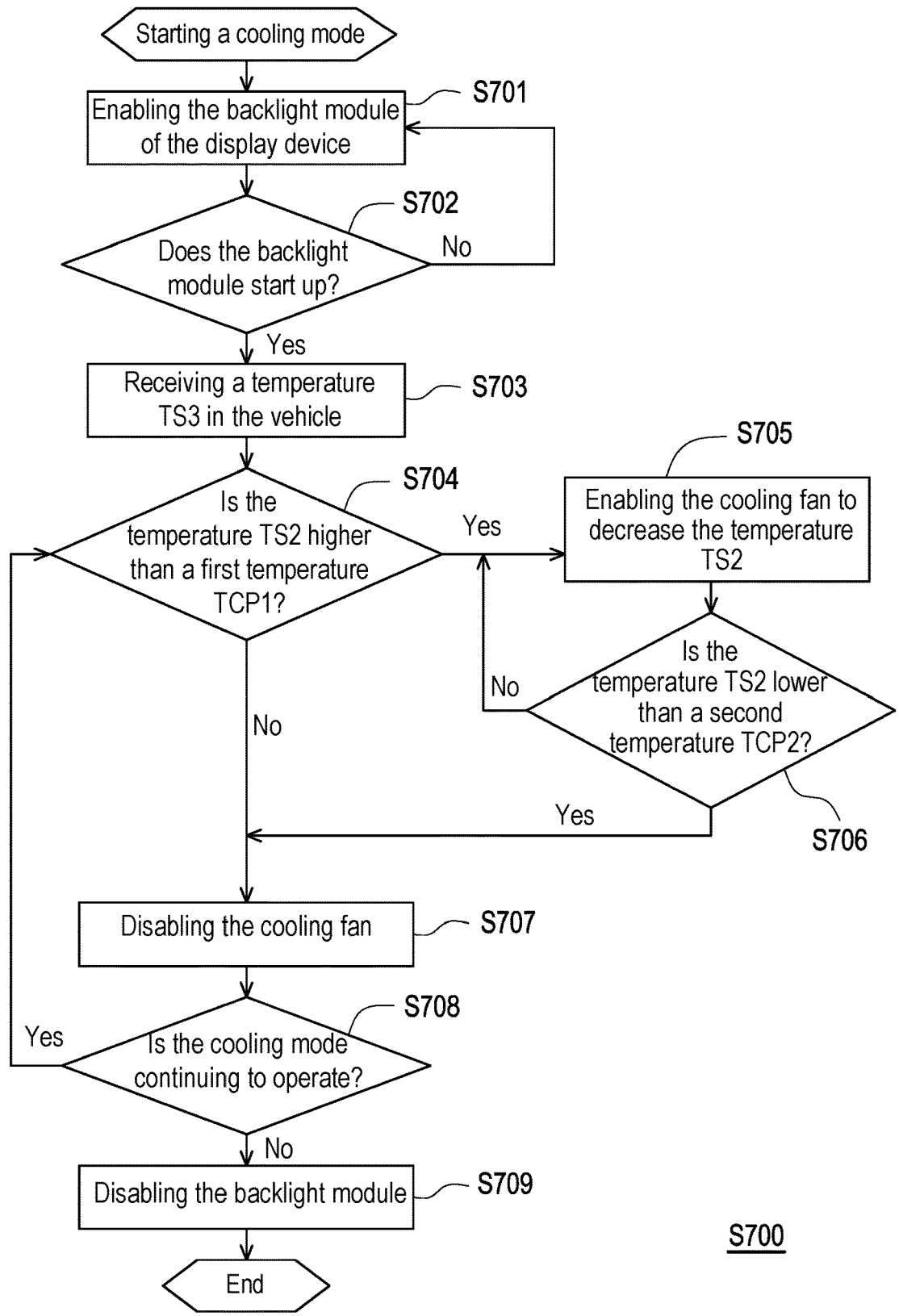
FIG. 5B illustrates a flow chart of a control method according to an embodiment of the disclosure.

FIG. 5B illustrates a flow chart of a control method according to an embodiment of the disclosure Referring to FIG. 1 and FIG. 5B, in the embodiment, a control method S700 is used for the cooling system 100. The control method S700 includes steps S701 to S709. After the air-conditioning system 150 and the car-machine system 160 is driven by the power circuit 170, a cooling mode is started up. The backlight module 111 is enabled in the step S701. The display device 110 enables the backlight module 111 in the step S701 and monitors a status of the backlight module 111 in the step S702. When the backlight module 111 does not start up, the display device 110 enables the backlight module 111 again in the step S701.

When the backlight module 111 starts up, the temperature controller 140 receives the temperature TS2 in the cockpit CPT from the temperature sensor 120_2 in the step S703. The temperature controller 140 determines the temperature TS2 in the step S704. When the temperature TS2 is higher than the first temperature TCP1, the temperature controller 140 enables the cooling fan 130_2 in the step S705. In the step S706, the temperature controller 140 determines the temperature TS2. When the temperature TS2 is higher than or equal to the second temperature TCP2, the temperature controller 140 operates in the step S705. On the other hand, when the temperature TS2 is lower than the second temperature TCP2, the temperature controller 140 disables the cooling fan 130_2 in the step S707.

In the step S704, when the temperature TS2 is lower than or equal to the first temperature TCP1, the temperature controller 140 disables the cooling fan 130_2 in the step S707.

In the step S708, the temperature controller 140 determines whether to continue the cooling mode. When the cooling mode continues to operate, the temperature controller 140 operates in the step S704. When the cooling mode is finished, the display device 110 disables the backlight module 111 in the step S709 and finishes the control method S700.

The cooling mode of the control method S700 is the first cooling mode CM1 as shown in the FIG. 2. In some embodiment, based on the cooling mode of the control method S700, the cooling system 100 may be simplified. For example, the temperature sensor 120_1 and the cooling fan 130_1 can be omitted.

Figure 6:
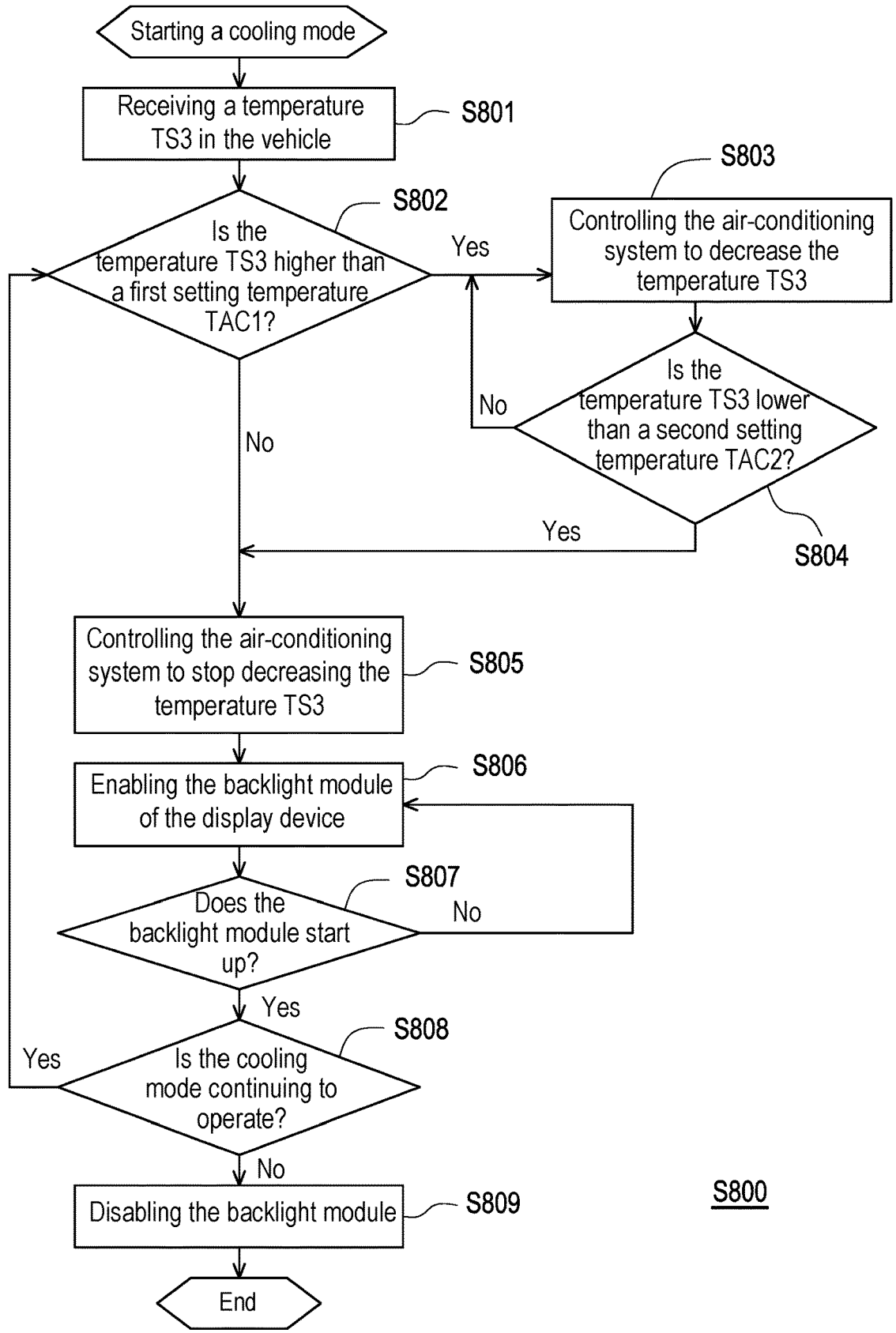
FIG. 6 illustrates a flow chart of a control method according to an embodiment of the disclosure.

FIG. 6 illustrates a flow chart of a control method according to an embodiment of the disclosure. Referring to FIG. 1 and FIG. 6, in the embodiment, a control method S800 is used for the cooling system 100. The control method S800 includes steps S801 to S809. The steps S801 to S807 are similar to the steps S501 to S507, so it will not be repeated here. In the step S808, the temperature controller 140 determines whether to continue the cooling mode. when the cooling mode continues to operate, the temperature controller 140 operates in the step S704. When the cooling mode is finished, the display device 110 disables the backlight module 111 in the step S809 and finishes the control method S800.

Figure 7A:
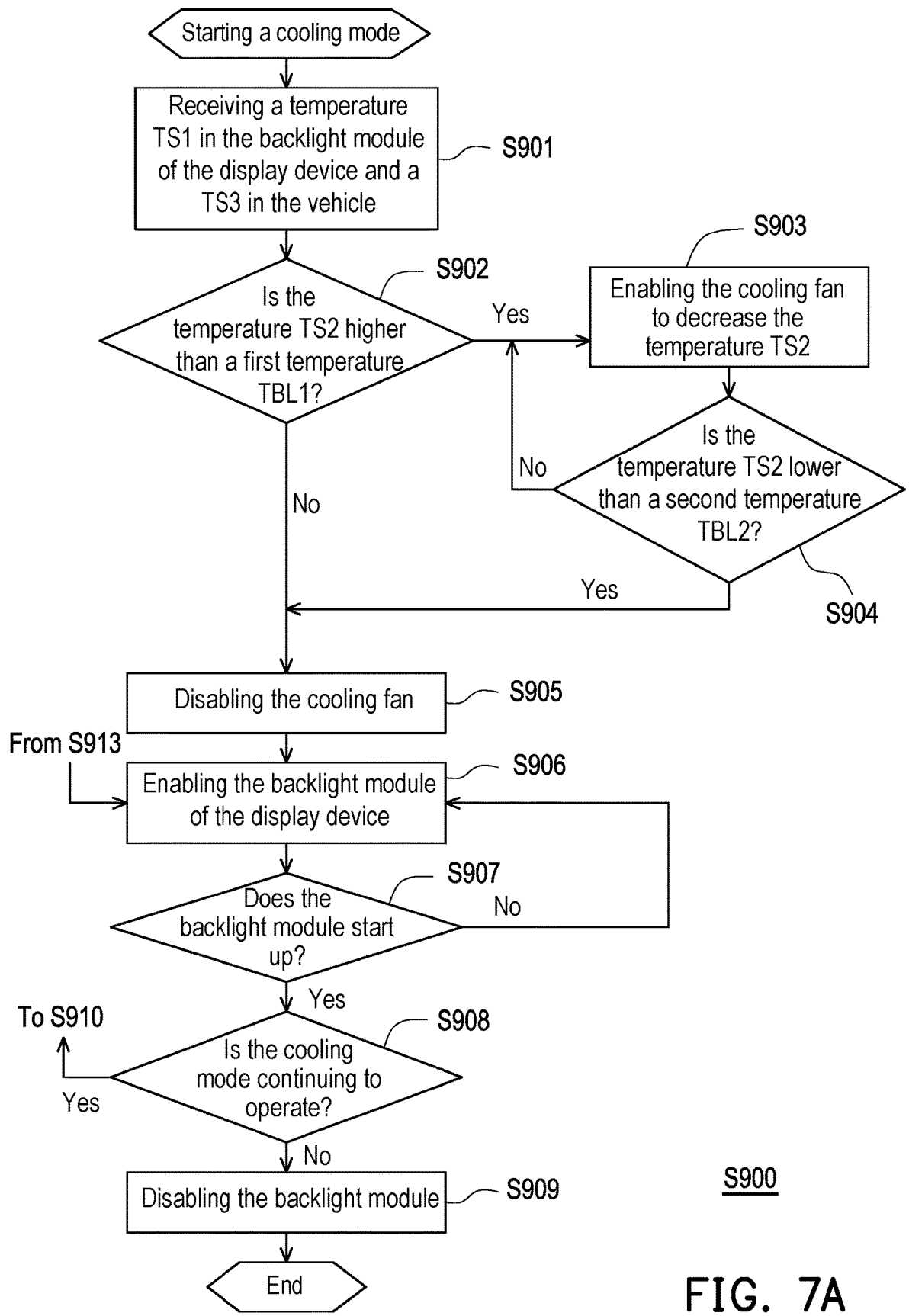
FIG. 7A and FIG. 7B illustrate a flow chart of a control method according to an embodiment of the disclosure.
Figure 7B:
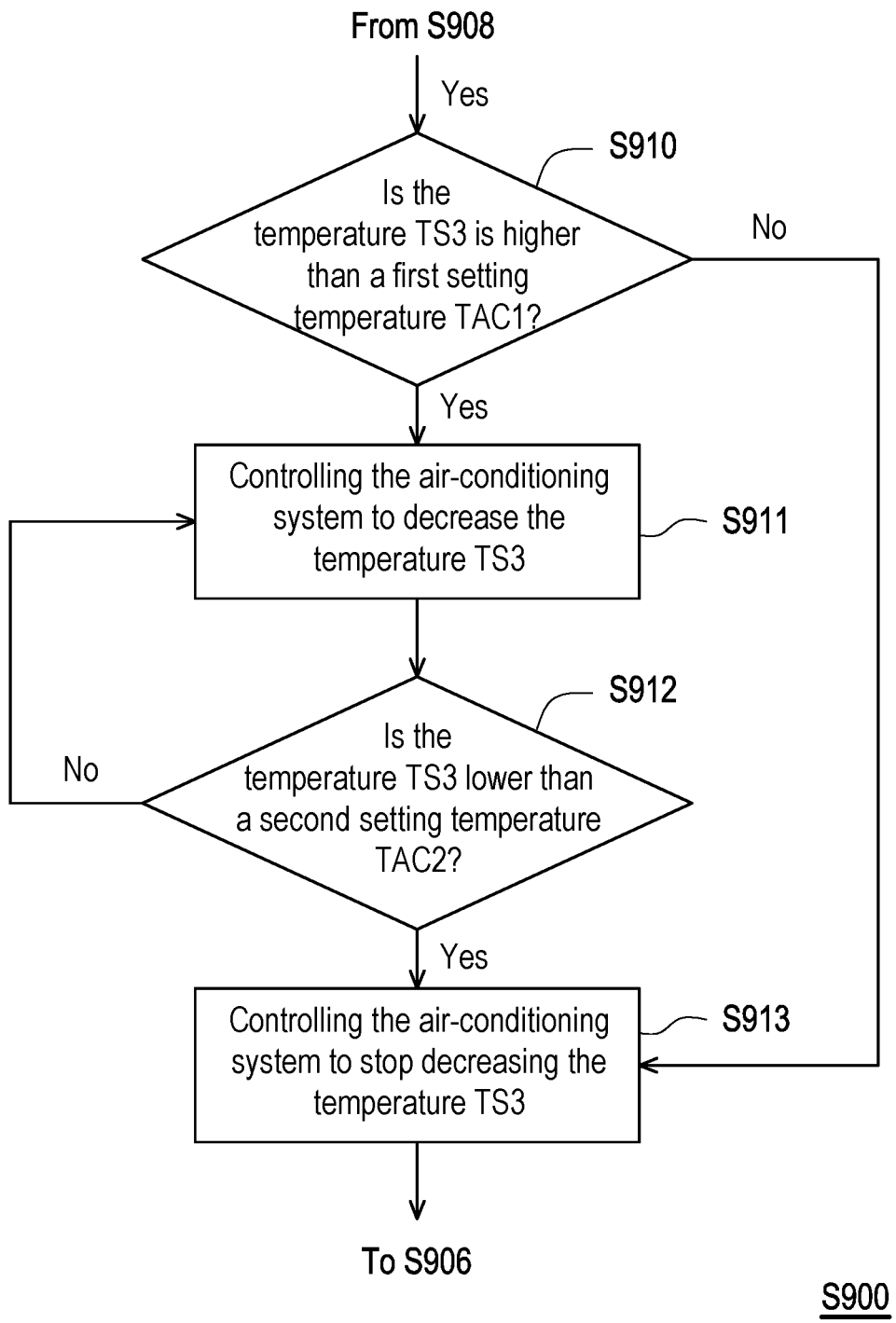

FIG. 7A and FIG. 7B illustrate a flow chart of a control method according to an embodiment of the disclosure. Referring to FIG. 1, FIG. 7A and FIG. 7B, in the embodiment, a control method S900 is used for the cooling system 100. The control method S900 includes steps S901 to S913. After the air-conditioning system 150 and the car-machine system 160 is driven by the power circuit 170, a cooling mode is started up. The temperature controller 140 receives the temperature TS1 in the backlight module 111 from the temperature sensor 120_1 in the step S901. The temperature controller 140 determines the temperature TS1 in the step S902. When the temperature TS1 is higher than the first temperature TBL1 (for example, 50±3° C., but not be limited thereto), the temperature controller 140 enables the cooling fan 130_1 in the step S903.

In the step S904, the temperature controller 140 determines the temperature TS1. When the temperature TS1 is higher than or equal to the second temperature TBL2 (for example, 40±3° C., but not be limited thereto), the temperature controller 140 operates in the step S903. On the other hand, when the temperature TS1 is lower than the second temperature TBL2, the temperature controller 140 disables the cooling fan 130_1 in the step S905.

In the step S902, when the temperature TS1 is lower than or equal to the first temperature TBL1, the temperature controller 140 disables the cooling fan 130_1 in the step S905.

After the backlight module 111 is cooled down in the step S905, the backlight module 111 is enabled in the step S906.

The display device 110 enables the backlight module 111 in the step S906 and monitors a status of the backlight module 111 in the step S907. When the backlight module 111 does not start up, the display device 110 enables the backlight module 111 again in the step S906. When the backlight module 111 starts up, the temperature controller 140 determines whether to continue the cooling mode in the step S908. When the cooling mode continues to operate, the temperature controller 140 operates in the step S910. When the cooling mode is finished, the display device 110 disables the backlight module 111 in the step S909. After the step S909, the cooling system 100 finishes the control method S900.

In the step S910, the temperature controller 140 determines the temperature TS3. When the temperature TS3 is higher than a first setting temperature TAC1, the temperature controller 140 controls the air-conditioning system to decrease the temperature TS3 in the step S911. In the step S912, the temperature controller 140 determines the temperature TS3. When the temperature TS3 is higher than or equal to a second setting temperature TAC2, the temperature controller 140 operates in the step S911. On the other hand, when the temperature TS3 is lower than the second setting temperature TAC2, the temperature controller 140 controls the air-conditioning system 150 to stop decreasing the temperature TS3 in the step S913. After the step S913, the backlight module 111 is enabled.

In the step S910, when the temperature TS3 is lower than or equal to the first setting temperature TAC1, the temperature controller 140 controls the air-conditioning system 150 to stop decreasing the temperature TS3 in the step S913.

The cooling mode of the control method S900 includes the second cooling mode CM2 and the third cooling mode CM3 as shown in the FIG. 2. In some embodiment, based on the cooling mode of the control method S900, the cooling system 100 may be simplified. For example, the temperature sensor 120_2 and the cooling fan 130_2 can be omitted.

In the embodiment, the step S910 is after the step S908. In some embodiments, the step S910 is after one of the steps S901, S902 and S905. Therefore, the air-conditioning system 150 is turned on when the cooling fan 130_1 is enabled.

Figure 8:
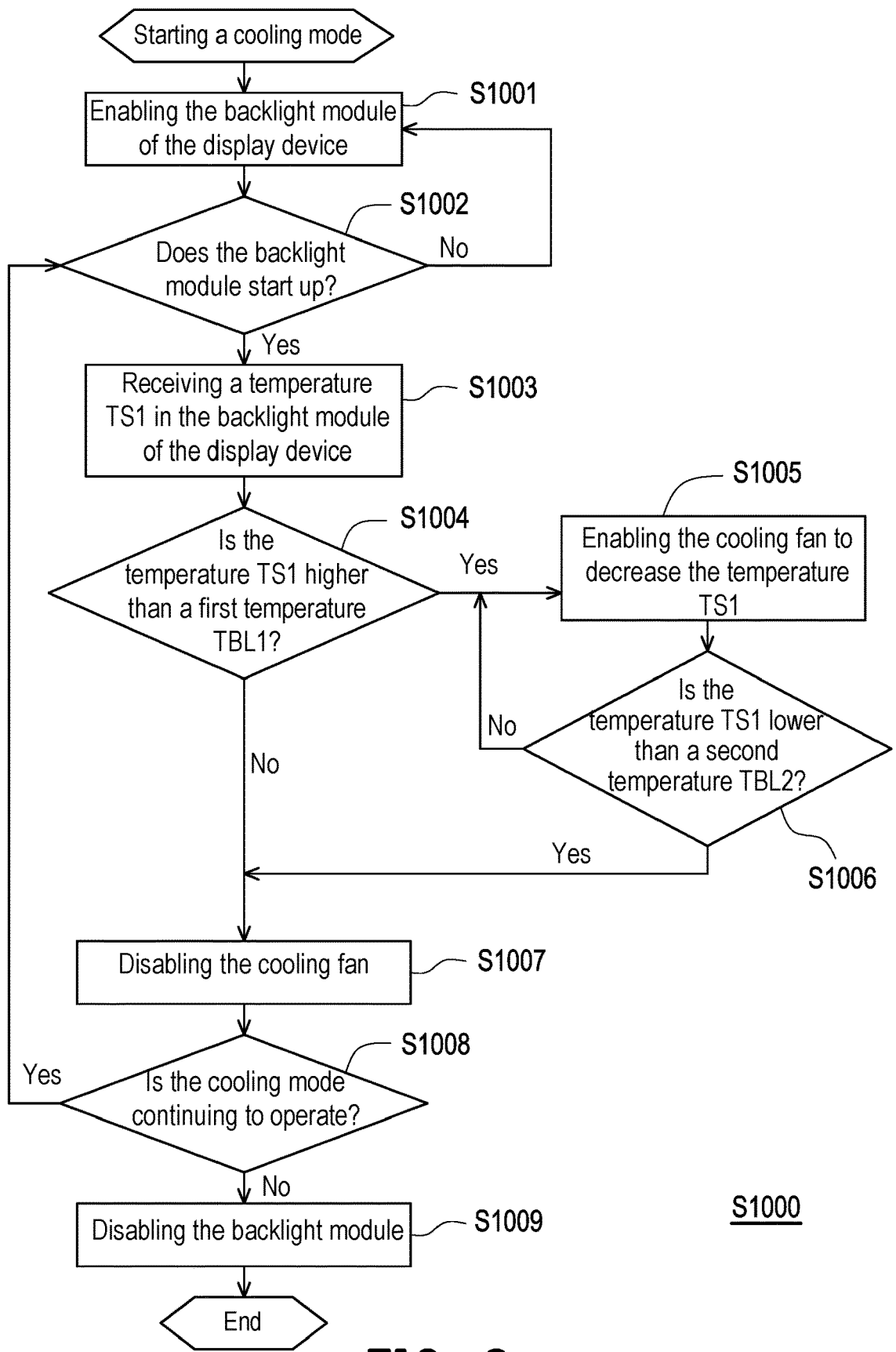
FIG. 8 illustrates a flow chart of a control method according to an embodiment of the disclosure.

FIG. 8 illustrates a flow chart of a control method according to an embodiment of the disclosure. Referring to FIG. 1 and FIG. 8, in the embodiment, a control method S1000 is used for the cooling system 100. The control method S1000 includes steps S1001 to S1009. After the air-conditioning system 150 and the car-machine system 160 is driven by the power circuit 170, a cooling mode is started up. The backlight module 111 is enabled in the step S1001. The display device 110 enables the backlight module 111 in the step S1001 and monitors a status of the backlight module 111 in the step S1002. When the backlight module 111 does not start up, the display device 110 enables the backlight module 111 again in the step S1001.

When the backlight module 111 starts up, the temperature controller 140 controls the temperature sensor 120_1 to sense the temperature TS1 of the backlight module 111 in the step S1003. In other words, the temperature sensor 120_1 starts to sense the temperature TS1 of the backlight module 111 after the backlight module 11 is started up. Thus, the display device 110 displays the temperature TS1 of the backlight module 111. The user can obtain the temperature TS1 displayed by the display device 110. The temperature controller 140 determines the temperature TS1 in the step S1004. When the temperature TS1 is higher than the first temperature TBL1, the temperature controller 140 enables the cooling fan 130_1 in the step S1005. In the step S1006, the temperature controller 140 determines the temperature TS1. When the temperature TS1 is higher than or equal to the second temperature TBL2, the temperature controller 140 operates in the step S1005. On the other hand, when the temperature TS1 is lower than the second temperature TBL2, the temperature controller 140 disables the cooling fan 130_1 in the step S1007.

In the embodiment, the cooling fan 130_1 is driven by the backlight module. For example, a driving power of the cooling fan 130_1 is provided by the driving power PWR1 of the backlight module 111, but not be limited thereto. In some embodiments, the driving power of the cooling fan 130_1 is different from the driving power PWR1 of the backlight module 111.

After the step S1007, the temperature controller 140 determines whether to continue the cooling mode in the step S1008. When the cooling mode continues to operate, the temperature controller 140 operates in the step S1002. When the cooling mode is finished, the display device 110 disables the backlight module 111 in the step S1009. After the step S1009, the cooling system 100 finishes the control method S1000.

The cooling mode of the control method S900 is the third cooling mode CM3 as shown in the FIG. 2. In some embodiment, based on the cooling mode of the control method S900, the cooling system 100 may be simplified. For example, the temperature sensor 120_2 and the cooling fan 130_2 can be omitted.

Figure 9:
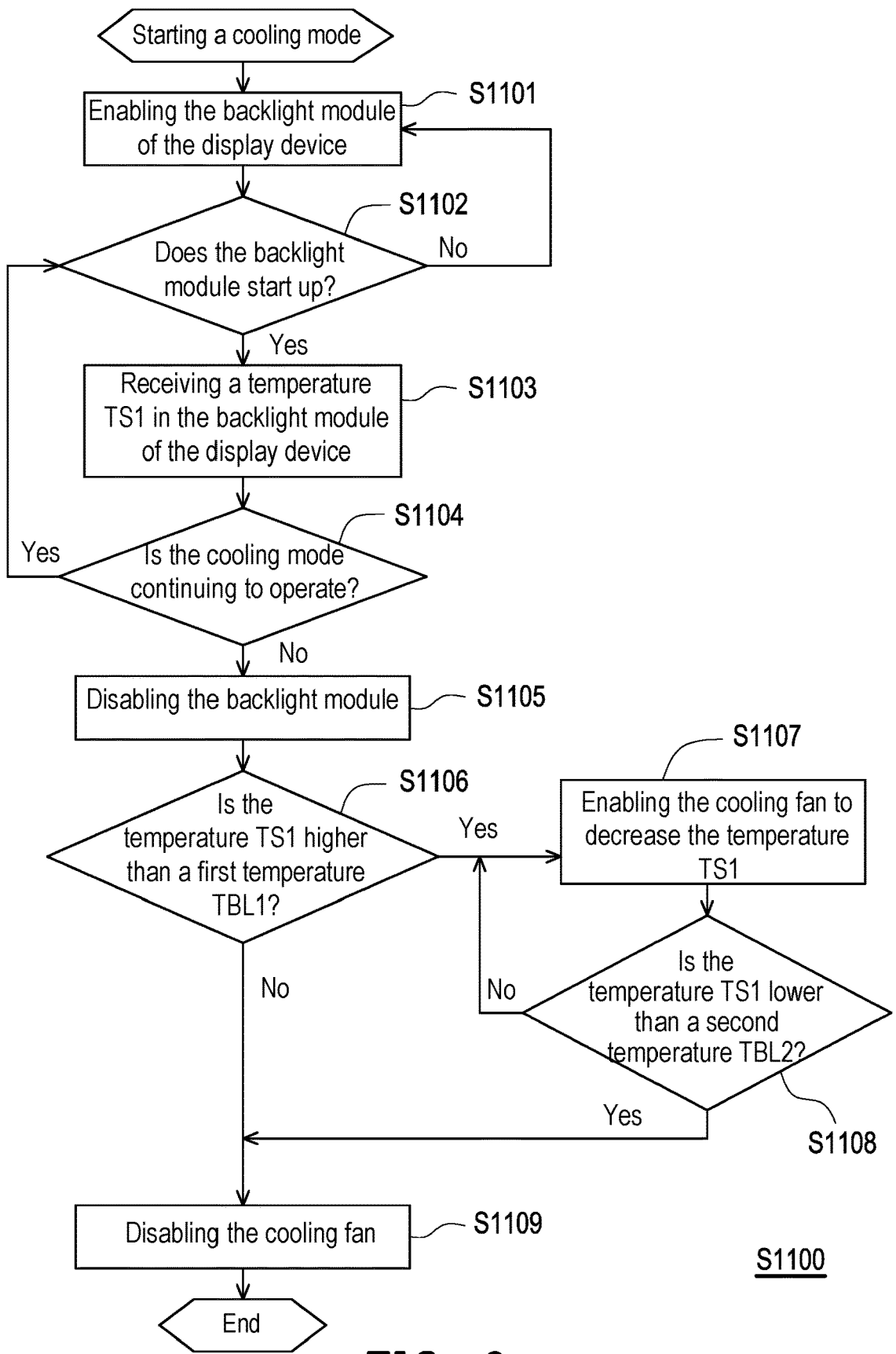
FIG. 9 illustrates a flow chart of a control method according to an embodiment of the disclosure.

FIG. 9 illustrates a flow chart of a control method according to an embodiment of the disclosure. Referring to FIG. 1 and FIG. 9, in the embodiment, a control method S1100 is used for the cooling system 100. The control method S1100 includes steps S1101 to S1109. The control method S1100 is an adjusted embodiment of the control method S1000. After the air-conditioning system 150 and the car-machine system 160 is driven by the power circuit 170, a cooling mode is started up. The backlight module 111 is enabled in the step S1101. The display device 110 enables the backlight module 111 in the step S1101 and monitors a status of the backlight module 111 in the step S1102. When the backlight module 111 does not start up, the display device 110 enables the backlight module 111 again in the step S1101.

When the backlight module 111 starts up, the temperature controller 140 receives the temperature TS1 in the backlight module 111 from the temperature sensor 120_1 in the step S1103. After the step S1103, the temperature controller 140 determines whether to continue the cooling mode in the step S1104. When the cooling mode continues to operate, the temperature controller 140 operates in the step S1102. When the cooling mode is finished, the display device 110 disables the backlight module 111 in the step S1105.

After the step S1105, the temperature controller 140 determines the temperature TS1 in the step S1006. When the temperature TS1 is higher than the first temperature TBL1, the temperature controller 140 enables the cooling fan 130_1 in the step S1107. In the step S1108, the temperature controller 140 determines the temperature TS1. When the temperature TS1 is higher than or equal to the second temperature TBL2, the temperature controller 140 operates in the step S1107. On the other hand, when the temperature TS1 is lower than the second temperature TBL2, the temperature controller 140 disables the cooling fan 130_1 in the step S1109. After the step S1009, the cooling system 100 finishes the control method S1000.

In the control method S1000, the backlight module 111 is disabled the backlight module after disabling the cooling fan. In the control method S1100, the backlight module 111 is disabled the backlight module before disabling the cooling fan.

Figure 10A:
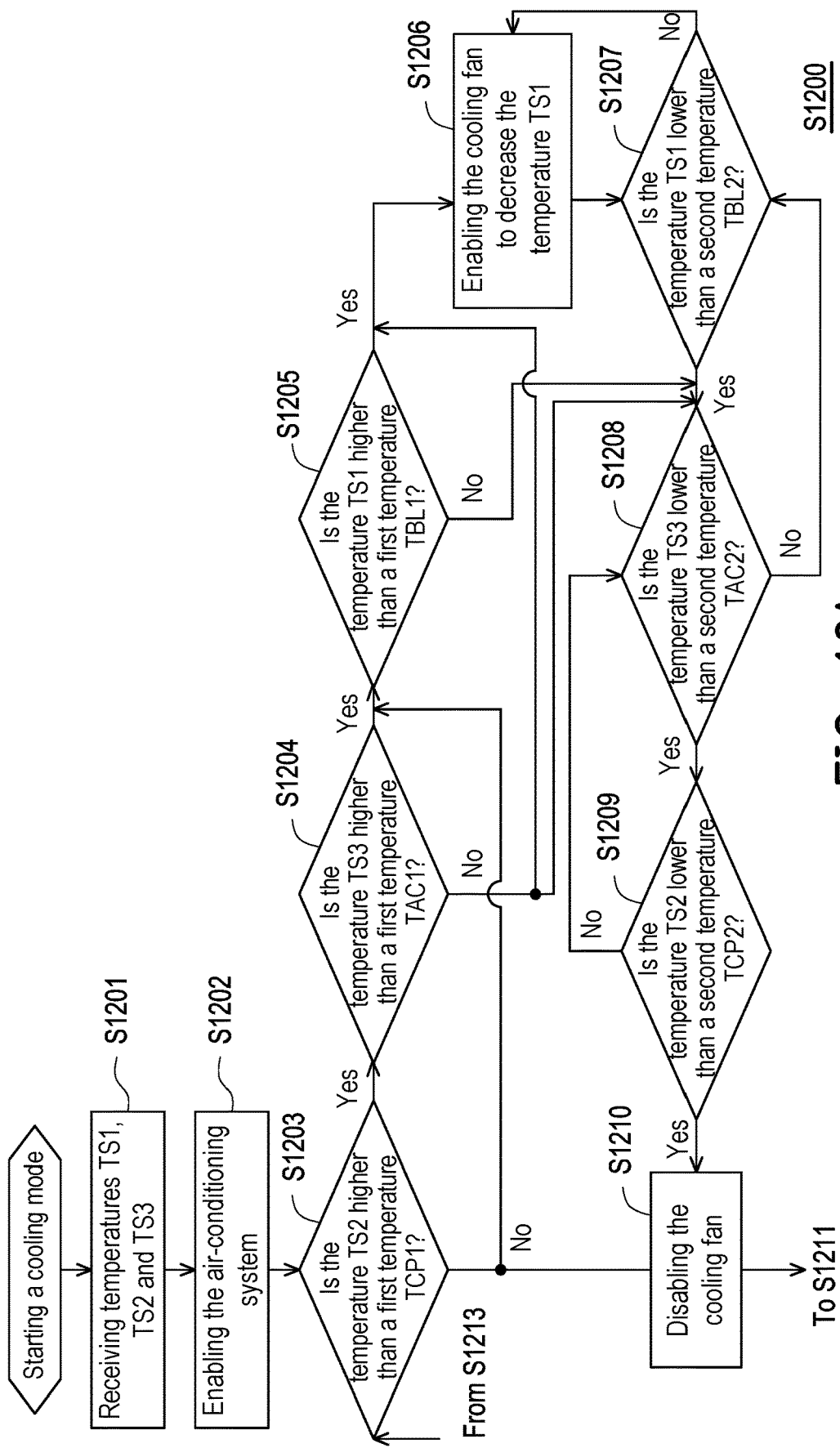
FIG. 10A and FIG. 10B illustrates a flow chart of a control method according to an embodiment of the disclosure.
Figure 10B:
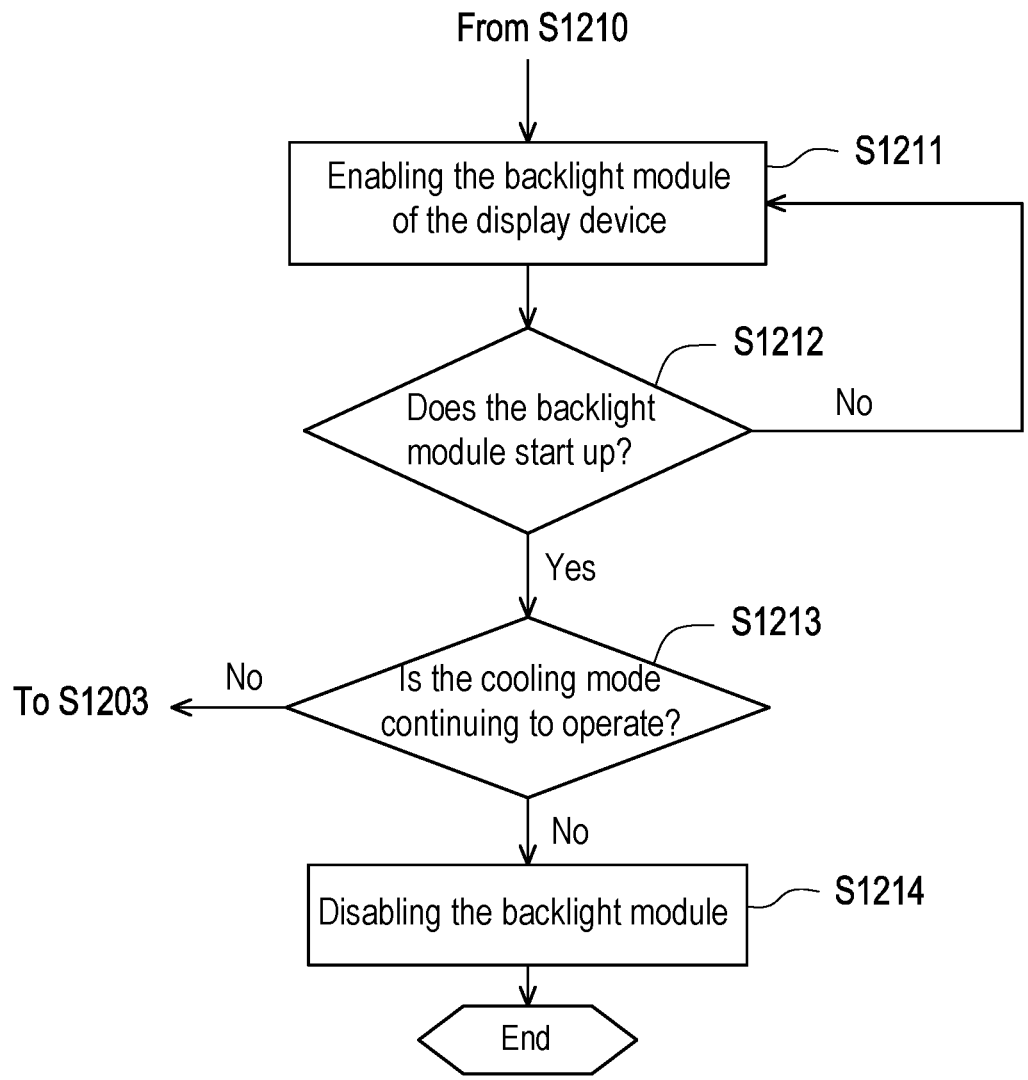

FIG. 10A and FIG. 10B illustrate a flow chart of a control method according to an embodiment of the disclosure. Referring to FIG. 1, FIG. 10A and FIG. 10B, in the embodiment, a control method S1200 is used for the cooling system 100. The control method S1200 includes steps S1201 to S1214. After the air-conditioning system 150 and the car-machine system 160 is driven by the power circuit 170, a cooling mode is started up. The temperature controller 140 receives the temperatures TS1, TS2 and TS3 in the step S1201. In the step S1202, the cooling system 100 enables the air-conditioning system 150 in the step S1202.

In the step S1203, the temperature controller 140 determines the temperature TS2. when the temperature TS2 is lower than or equal to the first temperature TCP1 (for example, 28±3° C., but not be limited thereto), the temperature controller 140 disables the cooling fan 130_1 in the step S1210. When the temperature TS2 is higher than the first temperature TCP1, the temperature controller 140 determines the temperature TS3 in the step S1204. When the temperature TS3 is higher than the first setting temperature TAC1 (for example, 35±3° C., but not be limited thereto), the temperature controller 140 determines the temperature TS1 in the step S1205. When the temperature TS3 is lower than or equal to the first setting temperature TAC1, the temperature controller 140 compares the temperature TS3 and the second setting temperature TAC2 in the step S1208.

In the step S1205, when the temperature TS1 is higher than the first temperature TBL1 (for example, 50±3° C., but not be limited thereto), the temperature controller 140 enables the cooling fan 130_1 in the step S1206. After the step S1206, the temperature controller 140 determines compares the temperature TS1 and the second temperature TBL2 in the step S1207. When the temperature TS1 is higher than or equal to the second temperature TBL2 (for example, 40±3° C., but not be limited thereto), the temperature controller 140 operates in the step S1206. On the other hand, when the temperature TS1 is lower than the second temperature TBL2, the temperature controller 140 compares the temperature TS3 and the second setting temperature TAC2 in the step S1208.

In the step S1208, when the temperature TS3 is higher than or equal to a second setting temperature TAC2 (for example, 25±3° C., but not be limited thereto), the temperature controller 140 operates in the step S1207. On the other hand, when the temperature TS3 is lower than the second setting temperature TAC2, the temperature controller 140 compares the temperature TS2 and the second temperature TCP2 in the step S1209.

In the step S1209, when the temperature TS2 is higher than or equal to the second temperature TCP2 (for example, 22±3° C., but not be limited thereto), the temperature controller 140 operates in the step S1208. On the other hand, when the temperature TS2 is lower than the second temperature TCP2, the temperature controller 140 disables the cooling fan 130_1 in the step S1210.

After the backlight module 111 is cooled down in the step S1210, the backlight module 111 is enabled in the step S1211. The display device 110 enables the backlight module 111 in the step S1211 and monitors a status of the backlight module 111 in the step S1212. When the backlight module 111 does not start up, the display device 110 enables the backlight module 111 again in the step S1211. When the backlight module 111 starts up, the temperature controller 140 determines whether to continue the cooling mode in the step S1213. When the cooling mode continues to operate, the temperature controller 140 operates in the step S1203. When the cooling mode is finished, the display device 110 disables the backlight module 111 in the step S1214. After the step S1214, the cooling system 100 finishes the control method S1200.

The cooling mode of the control method S1200 includes the first cooling mode CM1, the second cooling mode CM2 and the third cooling mode CM3 as shown in the FIG. 2.

In the embodiment, the mentioned operation of the control method S1200 may comply with the following truth table, but not be limited thereto.

| Truth table: | | | |
| --- | --- | --- | --- |
| TS2 | TS3 | TS1 | cooling fan 130_1 |
| TS2 > TCP1 | TS2 > TAC1 | TS1 > TBL1 | Enable |
| TS2 > TCP1 | TS2 > TAC1 | TS1 ≤ TBL1 | Disable |
| TS2 > TCP1 | TS2 ≤ TAC1 | TS1 ≤ TBL1 | Disable |
| TS2 > TCP1 | TS2 ≤ TAC1 | TS1 > TBL1 | Enable |
| TS2 ≤ TCP1 | TS2 > TAC1 | TS1 > TBL1 | Enable |
| TS2 ≤ TCP1 | TS2 > TAC1 | TS1 > TBL1 | Enable |
| TS2 ≤ TCP1 | TS2 ≤ TAC1 | TS1 ≤ TBL1 | Disable |
| TS2 ≤ TCP1 | TS2 ≤ TAC1 | TS1 ≤ TBL1 | Disable |

In some embodiments, when the temperature TS2 is lower than or equal to the first temperature TCP1, the temperature controller 140 operates at least one of the steps S1205, S1208 and S1210. In some embodiments, when the temperature TS3 is lower than or equal to the first temperature TAC1, the temperature controller 140 operates at least one of the steps S1205, 1206 and S1208.

Figure 11:
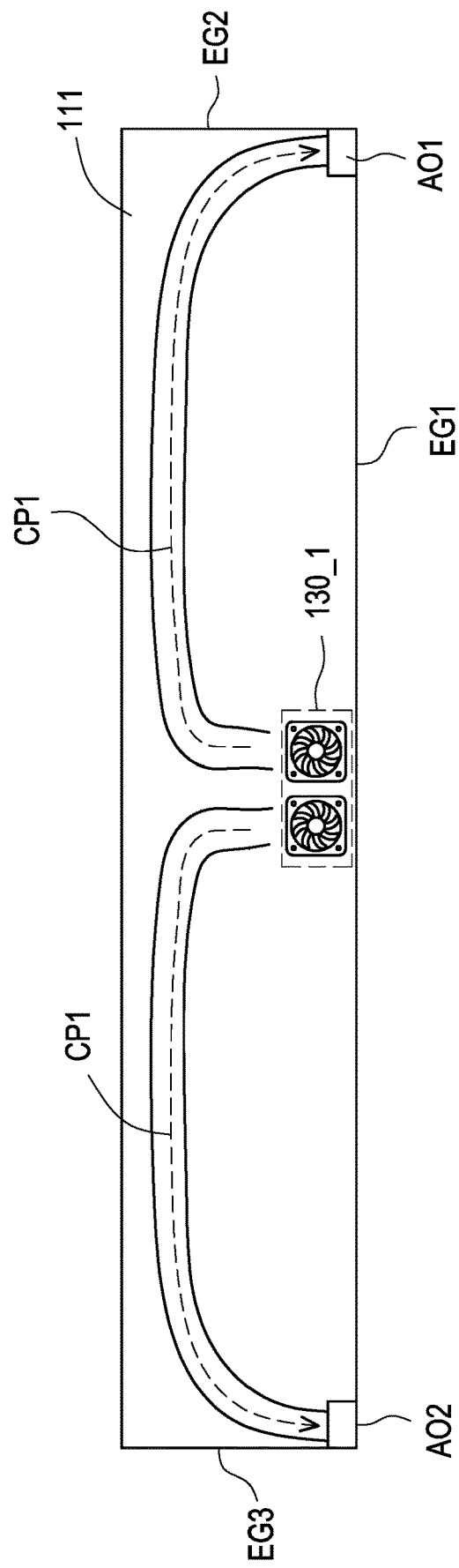
FIG. 11 illustrates a schematic diagram of a backlight module and a cooling fan according to an embodiment of the disclosure.

FIG. 11 illustrates a schematic diagram of a backlight module and a cooling fan according to an embodiment of the disclosure. FIG. 11 illustrates the backlight module 111 and the cooling fan 130_1. In the embodiment, the cooling fan 130_1 is configured near an edge EG1 of the backlight module 111, but not be limited thereto. The cooling fan 130_1 is acted as an air inlet of the backlight module 111. An air outlet AO1 of the backlight module 111 configured near a corner between the edge EG1 and an edge EG2 of the backlight module 111. An air outlet AO2 of the backlight module 111 configured near a corner between the edge EG1 and an edge EG3 of the backlight module 111. When the cooling fan 130_1 is enabled, the cooling fan 130_1 provide air flow through the cooling path CP1. The cooling path CP1 limits at least one flow direction of the air flow. Thus, a turbulence of the air flow could be decreased. In the embodiment, the backlight module 111 includes an airflow guiding structure AG for guiding the cooling path CP1, but not be limited thereto.

In summary, the cooling system and the control method take into account the ride comfort in the vehicles and a cooling mechanism of the devices (for example, the backlight module and/or the cockpit) in the vehicles.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A cooling system, comprising:
   a display device, configured to display an image, wherein the display device comprises a backlight module;
   a temperature sensor, configured in the backlight module, and configured to sense a first temperature of the backlight module and a second temperature of the backlight module, wherein the first temperature is higher than the second temperature;
   a cooling fan, configured in the backlight module, and configured to provide a cooling path; and
   a temperature controller, configured to receive the first temperature and the second temperature from the temperature sensor, and control the cooling fan to enable or disable;
   wherein the backlight module is disabled after disabling the cooling fan.
2. The cooling system of claim 1, further comprising:
   an air-conditioning system, electrically connected to the temperature controller, and configured to be turned on when the cooling fan is enabled.
3. The cooling system of claim 1, further comprising:
   an air-conditioning system, electrically connected to the temperature controller,
   wherein the backlight module is enabled after the air-conditioning system is enabled.
4. The cooling system of claim 1, wherein a driving power of the cooling fan is provided by a driving power of the backlight module.
5. The cooling system of claim 1, wherein a driving power of the cooling fan is different from a driving power of the backlight module.
6. The cooling system of claim 1, wherein when a temperature of the backlight module sensed by the temperature sensor is higher than the first temperature, the temperature controller enables the cooling fan.
7. The cooling system of claim 1, wherein when a temperature of the backlight module sensed by the temperature sensor is lower than the second temperature, the temperature controller disables the cooling fan.
8. The cooling system of claim 1, wherein the temperature sensor starts to sense a temperature of the backlight module after the backlight module is started up.
9. The cooling system of claim 8, wherein the display device displays the temperature of the backlight module.
10. A control method of a cooling system, wherein the cooling system comprises a display device, a temperature sensor and a cooling fan, wherein the control method comprises:
    detecting a status of a backlight module of the display device;
    controlling the temperature sensor to sense a temperature of the backlight module after the backlight module is started up;
    enabling the cooling fan when the temperature of the backlight module sensed by the temperature sensor is higher than a first temperature;
    disabling the cooling fan when the temperature is lower than a second temperature,
    wherein the first temperature is higher than the second temperature; and
    disabling the backlight module after disabling the cooling fan.
11. The cooling system of claim 10, further comprising:
    disabling the backlight module before disabling the cooling fan.
12. A cooling system, comprising:
    a power circuit, configured to provide a driving power;
    a temperature sensor, configured in a cockpit, and configured to sense a first temperature of the cockpit and a second temperature of the cockpit, wherein the first temperature is higher than the second temperature;
a cooling fan, configured in the cockpit, and configured to provide a cooling path;
a temperature controller, configured to receive the first temperature and the second temperature from the temperature sensor, and control the cooling fan to enable or disable; and
a display device, configured to display an image,
wherein the display device comprises a backlight module, and
wherein the backlight module is started up when the cooling fan is disabled.

13. The cooling system of claim 12, further comprising:
an air-conditioning system, electrically connected to the temperature controller, and configured to enable the cooling fan according to the first temperature.

14. The cooling system of claim 12, further comprising:
a car-machine system, electrically connected to the temperature controller,
wherein the temperature controller is started up when the car-machine system is started up.

15. The cooling system of claim 14, wherein the driving power of the cooling system is provided by the car-machine system.

16. The cooling system of claim 12, wherein when a temperature sensed by the temperature sensor is higher than the first temperature, the temperature controller enables the cooling fan.

17. The cooling system of claim 12, wherein when a temperature sensed by the temperature sensor is lower than the second temperature, the temperature controller disables the cooling fan.

* * * * *